United States Patent Office 3,463,237
Patented Aug. 26, 1969

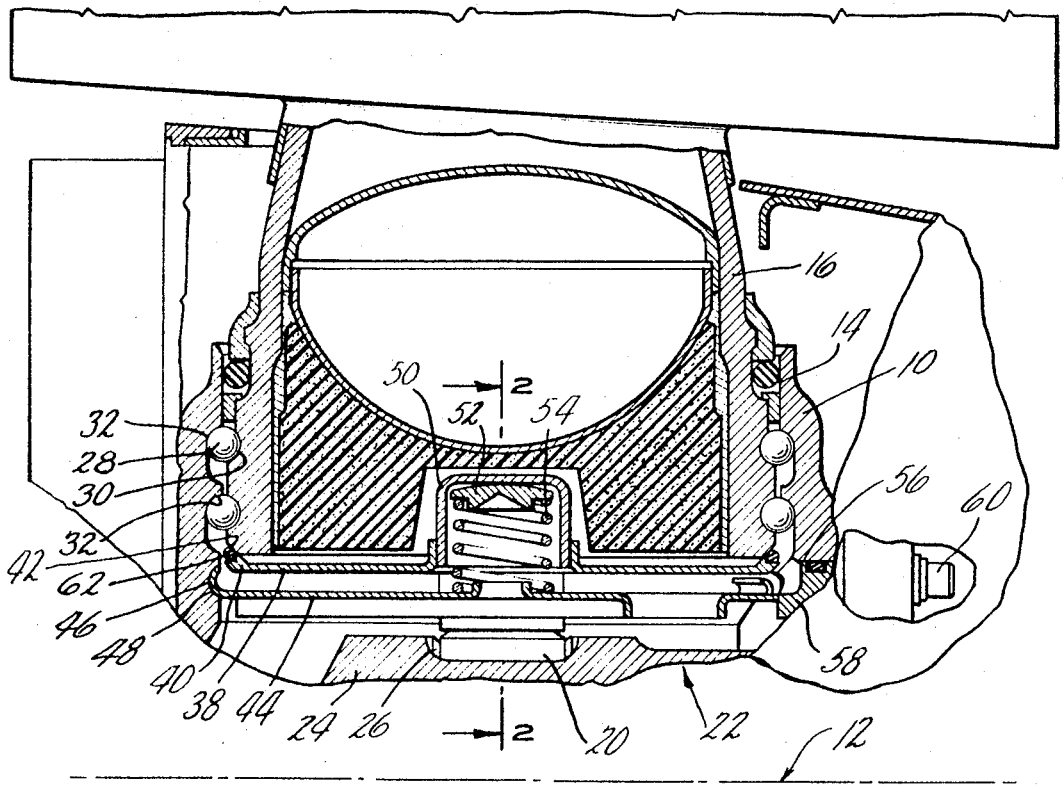

3,463,237
SEAL
Raymond N. Quenneville, Suffield, Conn., and Leonard L. Gaubis, Potomac, Md., assignors to United Aircraft Corporation, East Hartford, Conn., a corporation of Delaware
Filed Apr. 17, 1967, Ser. No. 631,470
Int. Cl. B64c 11/04, 11/02
U.S. Cl. 170—160.23          15 Claims

ABSTRACT OF THE DISCLOSURE

The propeller blade supporting hub is provided with a valve structure between the blade socket and the hub interior which is opened by insertion of the blade in the hub socket and automatically closed, to seal oil in and dirt out of the hollow hub interior, upon removal of the blade. The valve comprises a sealing disc cooperating with an emptied bearing race in the hub.

CROSS-REFERENCE TO RELATED APPLICATION

An application of Raymond N. Quenneville, Ser. No. 631,481, filed on Apr. 17, 1967, entitled "Quick Disconnect Retention," shows details of removal and insertion of ball bearings.

BACKGROUND OF THE INVENTION

This invention relates to sealing means and particularly to mechanism automatically sealing the blade socket when the propeller blade is removed from said socket.

Under certain conditions and particularly as a result of combat maneuvers it has been found convenient to be able, upon temporarily landing, to quickly remove one or more blades of a propeller and either manually replace the removed propeller blade with a spare propeller blade or proceed with no blades at all in the propeller hub utilizing other means of propulsion. When a propeller blade is removed from the blade socket in the hub, the hollow interior of the hub and the pitch changing mechanism usually contained therein is normally exposed. This exposure will allow the fluid, usually oil, in the hub to escape and allow contaminants to enter.

In order to eliminate this loss of oil and the entry of contaminants, applicants have invented a valve in the form of a seal plate which will automatically seal the interior of the hub upon removal of a propeller blade from its supporting socket in the hub.

SUMMARY OF INVENTION

An object of the invention is mechanism for sealing oil in and dirt out of an aeronautical propeller hub.

A further object is mechanism which will permit free circulation of oil from the hub to blade bearings in a propeller but will automatically seal the blade socket when the blade is removed.

Other objects and advantages will be apparent from the following specification and the accompanying drawings.

BRIEF DESCRIPTION OF THE DRAWINGS

FIGURE 1 is a partial vertical section of a blade mounting in a hub;
FIGURE 2 is a section along line 2—2 of FIGURE 1 showing further details of the mounting;
FIGURE 3 is a view similar to FIG. 2 but showing the seal in sealing position.

DESCRIPTION OF THE PREFERRED EMBODIMENT

As shown in FIGURE 1, a hub 10, mounted for rotation about an axis 12, is provided with a blade socket 14 adapted to receive a propeller blade 16 for pitch changing movements about an axis extending longitudinally of the blade. As shown in FIGURE 2, the blade is provided with a depending pin 18 which may be integral with or otherwise secured to the blade. Associated with this pin is a roller adapted to cooperate with any suitable pitch changing mechanism shown generally at 22 to change the pitch of the propeller. While any suitable pitch changing mechanism may be used, it is shown as a reciprocable piston 24 preferably hydraulically actuated and having a cross yoke 26 adapted to cooperate with the roller 20 to turn the blade on its pitch changing axis upon reciprocation of the piston 24.

The blade is retained in the hub by means of balls 28 forming an antifriction bearing with ball race 30 formed on the exterior of the blade shank and ball race 32 formed on the interior of the hub socket. A seal 34 between the blade shank and the outboard portion of the hub socket will normally seal the hub socket.

Loading and unloading holes 36 are provided leading to the race 32 which, upon manual inward movement of the propeller blade, will permit the balls 28 to be removed from the races 30 and 32. Upon removal of the balls the blade may be then manually pulled directly out of the socket and thus removed entirely from the hub. Reference may be made, to an application by Raymond N. Quenneville, Ser. No. 631,481, entitled "Quick Disconnect Retention," filed on Apr. 17, 1967, for further details and explanation of the removal and reinsertion of the balls 28.

A sealing plate 38 is positioned in the inboard portion of the blade socket 14 and has an upturned flange 40 adapted to contact with a beveled portion 42 at the base of the blade. A three-legged support plate 44 having curled-up portions 46 at the ends of the legs is positioned in a mating groove 48 adajacent the inboard portion of the blade socket.

The seal plate 38 is provided with a doomed portion 50 in the center thereof. The doomed portion is adapted to receive a spring seat 52 for a spring 54 the other end of which seats upon the support 44 and tends to separate the support 44 and the seal plate 38 and incidentally to hold the blade in its outward position and the balls 28 on their seats 30 and 32.

The forward portion of the hub 10 is provided with a bore 56 which is closed by a plate 58 secured to the hub by any suitable means such as bolts 60.

The seal plate is assembled with the hub by passing it through the bore 56 and dropping it into the hub socket 14. The spring seat 52 and the spring 54 are then assembled with the seal plate and the support member 48 is inserted through the bore 56 and two of the legs are placed in groove 48 and the third leg into the interruption in the groove formed by the bore 56. The support plate 44 is then turned about the blade longitudinal axis to move the third leg out of the interrupted portion of the groove and into a solid portion thereof.

The seal plate 38 and its sealing ring 62, carried on the outboard portion of the upturned flange 40, has a greater diameter than the smallest diameter of the ball seat 32. Hence when the seal place 38 is not held in the downward position as shown in FIGURE 1 by the beveled portion 42 on the base of the blade, it is forced outward by the spring 54 to bring the seal 62 into contact with the nearest race 32. As the seal plate 38 is an imperforate plate and the spring 54 forces the seal 62 into sealing relation with the race 32 when the blade 16 is removed from the socket 14 the seal plate 38 will thus automatically act as a valve and seal the interior of the hub and prevent the escape of oil or the entrance of contaminants when the blade 16 is removed.

The seal plate 38 is accurately spaced axially of the blade and from the support 44 so that the support 44 will provide a stop for inward movement of the blade and upon such inward movement serve to accurately locate the balls 28 and the race 30 in line with the loading holes 36 to facilitate the insertion and removal of the balls into and from the hub.

As shown in FIGURE 2 the seal plate 38 has a depending flanged sleeve secured to and extending through the plate. A second sleeve 66 is telescoped in sealed relation with the sleeve 64 and is closed at its inboard end. The sleeve 66 is adapted to receive the roller 20 and is held thereon by washer 68 and pin 70. The pin 18 extending downward from the propeller blade fits into sleeve 66 so that sleeve 66 helps form the connection between the blade and the pitch changing mechanism. The sleeves 66 and 64 form an oil tight connection with the seal plate 38 and also serve to cause the seal plate 38 to rotate with the propeller in the pitch changing movements of the propeller. The sleeve 64 extends downward between two of the legs of the support plate 44 so that the support plate 44 does not turn in the groove 48 during the pitch changing movement.

When the seal plate 38 travels outward, under the influence of spring 54 as the blade is removed, it carries with it sleeve 64 and sleeve 66 and the roller 20. As the seal 62 moves into sealing relation about as soon as the seal mechanism 34 leaves the end of the hub socket the roller 20 and the pitch changing mechanism in the hub are protected from contamination while the blade is removed. This outward movement of the roller 20 with the seal plate 38 permits assembly of the pitch changing mechanism and the hub with the seal plate in position and also permits ready assembly of the spare blade with the pitch changing mechanism.

From the above description it will be appreciated that I have provided a valve type structure in the propeller hub which structure is automatically operated by insertion or removal of the propeller blade to provide lubrication for the blade bearings by connecting the blade socket with the hub interior upon insertion of the blade into its socket and to seal the oil in and contaminants out of the hub interior upon removal of a blade.

We claim:

1. A propeller hub having a blade receiving socket forming an open connection with the interior of said hub, valve means in said connection sealing said interior of said hub and removable means mechanically holding said valve open.

2. A propeller hub having a blade receiving socket, valve means in said hub connecting said socket with the interior of said hub, a blade, means, coacting with said blade, opening said valve upon insertion of said blade in said socket.

3. A hub as claimed in claim 1 including means urging said valve to closed position.

4. A hub as claimed in claim 2 including means closing said valve upon removal of said blade from said socket.

5. A hub as claimed in claim 4 in which said closing means is spring means.

6. A hub as claimed in claim 1 in which said valve means is a poppet type valve.

7. A propeller hub having a blade receiving socket, valve means in said hub connecting said socket with the interior of said hub, a blade, means, responsive to insertion and removal of said blade from said socket, opening and closing said valve.

8. In a propeller hub, having a blade receiving open socket opening from the exterior of said hub into the interior of said hub, a movable plate located adjacent the bottom of said socket, sealing means coacting with said plate and said hub in one position of said plate and sealing the opening to the interior of said hub through said open socket.

9. In a propeller hub as claimed in claim 8, means, including a bearing race for removably rotatably supporting a propeller blade in said hub, said sealing means coacting with said plate and said race to seal said opening to said interior.

10. In a propeller hub having a socket for receiving a propeller blade and opening into the interior of said hub, a movable plate adjacent the inner end of said socket and inboard of a blade positioned in said socket, and sealing means, coacting with said plate and the walls of said socket in one position of said plate, sealing the opening to the interior of said hub through said open socket when the blade is removed from said socket.

11. In combination with a propeller hub, having a blade receiving socket, a propeller blade, means for removably retaining said propeller blade in said socket, a sealing plate inboard of said blade, means urging said plate outwardly in said socket and into sealing engagement with said hub and sealing said hub interior from a portion of said socket when said blade is removed.

12. A combination as claimed in claim 10 including means holding said plate out of sealing engagement and opening said hub to said socket when said blade is positioned in said socket.

13. A combination as claimed in claim 10 in which the blade is rotatably mounted for pitch changing movements in said hub and said plate is an imperforate plate having a cup-shaped depression therein, a pin depending from said blade and extending into said cup-shaped depression, and pitch changing means coacting with the exterior of said cup-shaped depression.

14. A combination as claimed in claim 10 including pitch changing mechanism in said hub and in which the sealing plate is located between said mechanism and said blade and includes means connecting said blade with said mechanism.

15. In combination a hub having a socket, a removable propeller blade having a portion extending into said socket, means rotatably supporting said blade in said socket including at least one row of ball bearings, a bearing race in said portion and a mating bearing race in said socket, a ball loading passageway in said hub spaced axially of the bearing race in the hub, said portion movable axially to align the bearing race in said portion with said passageway, a movable seal plate in said hub inboard of said blade portion and positioned by said portion, stop means, including said plate, limiting inboard axial movement of said portion and said plate to align said bearing race in said portion with said passageway, said seal plate including means coacting with said hub to seal said socket and socket bearing race from the interior of said hub and means moving said seal plate outboard to sealing position upon removal of said blade.

References Cited

UNITED STATES PATENTS

| | | | |
|---|---|---|---|
| 1,849,012 | 3/1932 | Lougheed | 170—160.58 |
| 2,283,128 | 5/1942 | Ring. | |
| 2,352,336 | 6/1944 | Martin et al. | 170—160.33 |
| 2,425,938 | 8/1947 | Hover. | |
| 2,566,696 | 9/1951 | Cushman | 170—160.58 X |
| 2,623,601 | 12/1952 | Frankland | 308—198 X |

FOREIGN PATENTS

| | | |
|---|---|---|
| 884,118 | 4/1943 | France. |

EVERETTE A. POWELL, JR., Primary Examiner

U.S. Cl. X.R.

170—160.58